United States Patent
Miyazawa et al.

(10) Patent No.: US 12,330,490 B2
(45) Date of Patent: Jun. 17, 2025

(54) VEHICLE BODY STRUCTURE FOR ELECTRIC VEHICLE

(71) Applicants: Kobe Steel, Ltd., Kobe (JP); TOYOTA JIDOSHA KABUSHIKI KAISHA, Toyota (JP)

(72) Inventors: Sadao Miyazawa, Kobe (JP); Kenichi Watanabe, Kobe (JP); Kenta Kojima, Toyota (JP)

(73) Assignees: Kobe Steel, Ltd., Kobe (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 343 days.

(21) Appl. No.: 17/661,650

(22) Filed: May 2, 2022

(65) Prior Publication Data

US 2022/0355656 A1    Nov. 10, 2022

(30) Foreign Application Priority Data

May 7, 2021    (JP) .................................. 2021-079287

(51) Int. Cl.
*B60K 1/04*    (2019.01)
*B62D 21/02*   (2006.01)

(52) U.S. Cl.
CPC ................ *B60K 1/04* (2013.01); *B62D 21/02* (2013.01); *B60K 2001/0438* (2013.01)

(58) Field of Classification Search
CPC ... B60K 1/04; B60K 2001/0438; B62D 21/02
See application file for complete search history.

(56) References Cited

U.S. PATENT DOCUMENTS 9,796,424 B2 * 10/2017 Sakaguchi ......... B62D 25/2036
10,494,034 B2 * 12/2019 Makowski .......... H01M 50/249
(Continued)

FOREIGN PATENT DOCUMENTS

DE    102014224545 A1 *  6/2016
DE    10 2016 013 633 A1   5/2018
(Continued)

OTHER PUBLICATIONS

The translation of Volz Karlheinz (DE 102014224545 A1) relied upon in the office action is included for clarity of the record. (Year: 2016).*

*Primary Examiner* — James A Shriver, II
*Assistant Examiner* — Nicholas R. Kandas
(74) *Attorney, Agent, or Firm* — Oblon, McClelland, Maier & Neustadt, L.L.P.

(57) ABSTRACT

A vehicle body structure for an electric vehicle includes: a battery disposed at a center lower portion of a vehicle body; a side sill being hollow and extending in a vehicle body front-rear direction outside in a vehicle width direction of the battery; a bridge beam member being hollow, disposed below the side sill and outside in the vehicle width direction of the battery, extending in the vehicle body front-rear direction, and having a cross section perpendicular to the vehicle body front-rear direction formed as a closed cross section; and at least one bridge pier member made of steel, extending in the vehicle width direction from the battery toward the bridge beam member, and having a cross section perpendicular to the vehicle width direction forming at least a part of a closed cross-sectional shape.

15 Claims, 7 Drawing Sheets

(56) References Cited

U.S. PATENT DOCUMENTS 11,192,438 B2 * 12/2021 Kerstan ................ B62D 21/15
2020/0369324 A1    11/2020 Koga et al.
2023/0144195 A1 *  5/2023 Kang

FOREIGN PATENT DOCUMENTS

| JP | 2008230418 A | * | 10/2008 |
| JP | 2015-74244 A | | 4/2015 |
| WO | WO 2012/063393 A1 | | 5/2012 |
| WO | WO 2018/163815 A1 | | 9/2018 |
| WO | WO 2019/151084 A1 | | 8/2019 |

* cited by examiner

VEHICLE BODY STRUCTURE FOR ELECTRIC VEHICLE

CROSS-REFERENCE TO RELATED APPLICATIONS

This application claims priority of Japanese Patent Application No. 2021-079287 filed on May 7, 2021 the contents of which are incorporated herein by reference.

TECHNICAL FIELD

The present invention relates to a vehicle body structure for an electric vehicle.

BACKGROUND ART

Electric vehicles are required to have higher collision safety performance than general fuel vehicles from the viewpoint of battery protection and the like. In an electric vehicle, in order to secure a range, a battery is widely arranged on the entire underfloor surface of the vehicle interior in many cases, and thus high collision safety performance (hereinafter, also referred to as side collision performance) is particularly required at the time of side collision. That is, when an object such as a pole collides with the side portion of the vehicle body due to spinning of the vehicle body or the like, it is necessary to protect the vehicle interior and the battery without being damaged.

For example, WO2019/151084 and DE102016013633 A1 discloses a vehicle body lower structure capable of suppressing deformation of a vehicle interior and improving side collision performance of a vehicle body. In the vehicle body lower structure, in order to obtain high side collision performance, a reinforcing member is disposed inside or below a columnar member on a vehicle body lower side portion referred to as a side sill to improve the side collision performance.

SUMMARY OF THE INVENTION

In the vehicle body structures of WO2019/151084 and DE102016013633 A1, the reinforcing member has a tubular structure extending in a vehicle width direction and having a closed cross section perpendicular to the vehicle width direction. In general, the tubular structure is easily bent and deformed by a load on the side portion, but is resistant to a load in an axial direction. Therefore, such a tubular reinforcing member extending in the vehicle width direction is resistant to an impact from the vehicle body side surface, and is effective for improving the side collision performance. However, when the tubular reinforcing member is adopted as a vehicle body structure of an electric vehicle, there is room for improvement in battery protection performance from the viewpoint of impact absorption performance.

An object of the present invention is to provide a vehicle body structure for an electric vehicle being lightweight and having high battery protection performance.

Solutions to Problems

The present invention provides a vehicle body structure for an electric vehicle including: a battery disposed at a center lower portion of a vehicle body; a side sill being hollow, the side sill extending in a vehicle body front-rear direction outside in a vehicle width direction of the battery; a first member being hollow, the first member disposed below the side sill and outside in the vehicle width direction of the battery, the first member extending in the vehicle body front-rear direction, the first member having a cross section perpendicular to the vehicle body front-rear direction formed as a closed cross section; and at least one second member made of steel, the at least one second member extending in the vehicle width direction from the battery toward the first member, the at least one second member having a cross section perpendicular to the vehicle width direction forming at least a part of a closed cross-sectional shape.

According to the configuration, when an object such as a pole collides with a side portion of the vehicle body, first, crushing of the hollow first member together with the side sill allows an impact to be absorbed, and the side sill and the first member allow an impact to be dispersed in the vehicle body front-rear direction. Next, since the second member extending in the vehicle width direction supports the first member from the inside in the vehicle width direction, the second member can firmly receive an impact from the vehicle side surface, and the impact can be further absorbed by the crushing of the second member. Therefore, in the vehicle body structure for an electric vehicle, lightweight and high battery protection performance can be achieved.

The second member may form a closed cross-sectional shape together with another member. In addition, the second member may independently form a closed cross-sectional shape.

According to these configurations, the closed cross-sectional shape formed by the second member can be variously designed.

The first member may be made of an extruded material. In addition, the first member may be made of steel.

According to these configurations, the first member can be easily manufactured at low cost. For example, when the first member is made of an extruded material, the extruded material may be made of an aluminum alloy. In addition, when the first member is made of steel, the first member can be configured by combining plates made of steel.

The closed cross section of the first member may be rectangular.

According to the configuration, the first member can be easily manufactured at low cost. In addition, the force received from an object such as a pole on the outer surface of the first member in the vehicle width direction can be released to the vehicle body frame or the like on the inner surface. That is, two surfaces facing each other in the vehicle width direction can be caused to act as a surface receiving a force and a surface releasing the force. In addition, the upper surface and the lower surface of the first member can be easily joined to other members as necessary. It should be noted that the rectangle here includes not only one rectangle but also a set of two or more rectangles.

A plurality of the second members may be arranged at intervals in the vehicle body front-rear direction.

According to the configuration, at the time of side collision, the first member can be supported at a plurality of places in the vehicle body front-rear direction by the plurality of second members. That is, it is possible to form a strong bridge structure in which the first member is used as a bridge beam and the second member is used as a bridge pier. With this structure, when an object such as a pole collides with the vehicle body side portion, an impact can be dispersed into a plurality of pieces from the bridge beam (first member) to the bridge pier (second member). Furthermore, since the second members are discretely arranged at intervals in the vehicle body front-rear direction, the weight can be reduced as compared with the case where the second members are continuously arranged. In addition, since a plurality of second members are arranged, only the second member arranged at a place where high strength is required can be designed with high strength. In other words, since a low-strength material or a small thickness can be adopted in a portion where high strength is not required, cost reduction and weight reduction can be achieved.

The arrangement interval of the second members in a vehicle body front-rear direction central portion may be relatively narrow.

According to the configuration, since the second members are densely arranged at a place (vehicle body front-rear direction central portion) where high strength is required, the strength at the place can be improved. The reason why high strength is required in the vehicle body front-rear direction central portion is that the center of gravity is positioned in the vehicle body front-rear direction central portion. For example, when an object such as a pole collides toward a position other than the center of gravity, the impact is released by rotation of the vehicle body. However, when an object such as a pole collides toward the center of gravity, the impact is applied to the vehicle body without being released because the vehicle body does not rotate. Therefore, the vehicle body front-rear direction central portion to which a relatively large impact may be applied is required to have a relatively high strength.

The second member arranged in the vehicle body front-rear direction central portion may have relatively high strength.

According to the configuration, as described above, the strength can be relatively improved in the vehicle body front-rear direction central portion where high strength is required. Here, in order to design the second member to have a relatively high strength, a material having high strength may be adopted, the thickness may be increased, or a strong shape may be adopted.

According to the present invention, it is possible to provide a vehicle body structure for an electric vehicle being lightweight and having high battery protection performance.

DETAILED DESCRIPTION OF THE PREFERRED EMBODIMENT

In the following, embodiments of the present invention will be described with reference to the accompanying drawings.

First Embodiment

Figure 1:
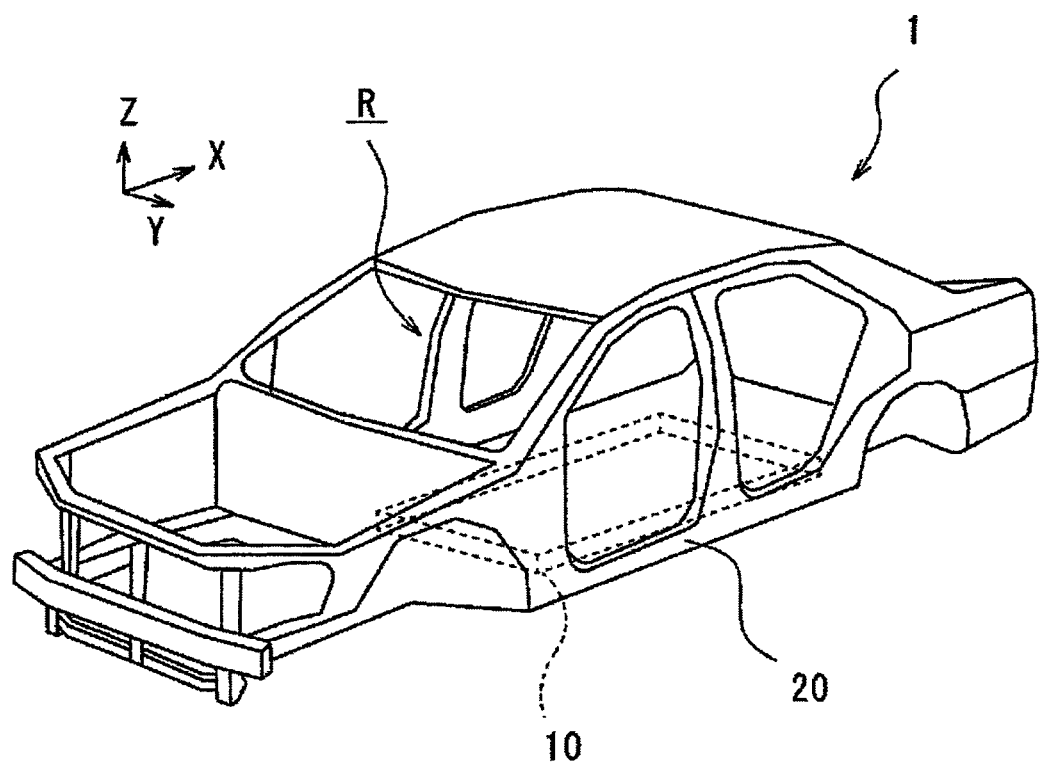
FIG. 1 is a perspective view showing a vehicle body structure for an electric vehicle.

Referring to FIG. 1, in the vehicle body structure 1 of the present embodiment, a battery 10 for propulsion is disposed at a center lower portion of the vehicle body. That is, the vehicle body structure 1 of the present embodiment is for an electric vehicle mounting the battery 10. The battery 10 is schematically illustrated including a protective case and the like, and is disposed on the entire underfloor surface of the vehicle interior R. In the present embodiment, a description will be given of the vehicle body structure 1 having high side collision performance in which the vehicle interior R and the battery 10 are protected without being damaged when an object such as a pole collides (that is, side-collides) with the vehicle body side portion due to spinning of the vehicle body or the like.

In FIG. 1, a vehicle body lateral direction (specifically, lateral direction to the left) is denoted by reference sign Y, a vehicle body rear direction is denoted by reference sign X, and a vehicle body upper direction is denoted by reference sign Z. That is, a vehicle width direction is shown in the direction Y and the opposite direction, a vehicle body front-rear direction is shown in the direction X and the opposite direction, and a vehicle height direction is shown in the direction Z and the opposite direction. These directions also apply in and after FIG. 2.

A pair of hollow side sills 20 extending in the vehicle body front-rear direction is disposed on both outer sides in the vehicle width direction of the battery 10. The pair of side sills 20 is disposed along both side lower portions in the vehicle width direction of the vehicle interior R. It should be noted that the side sill 20 is a member also referred to as a rocker in the vehicle body structure 1.

Figure 2:
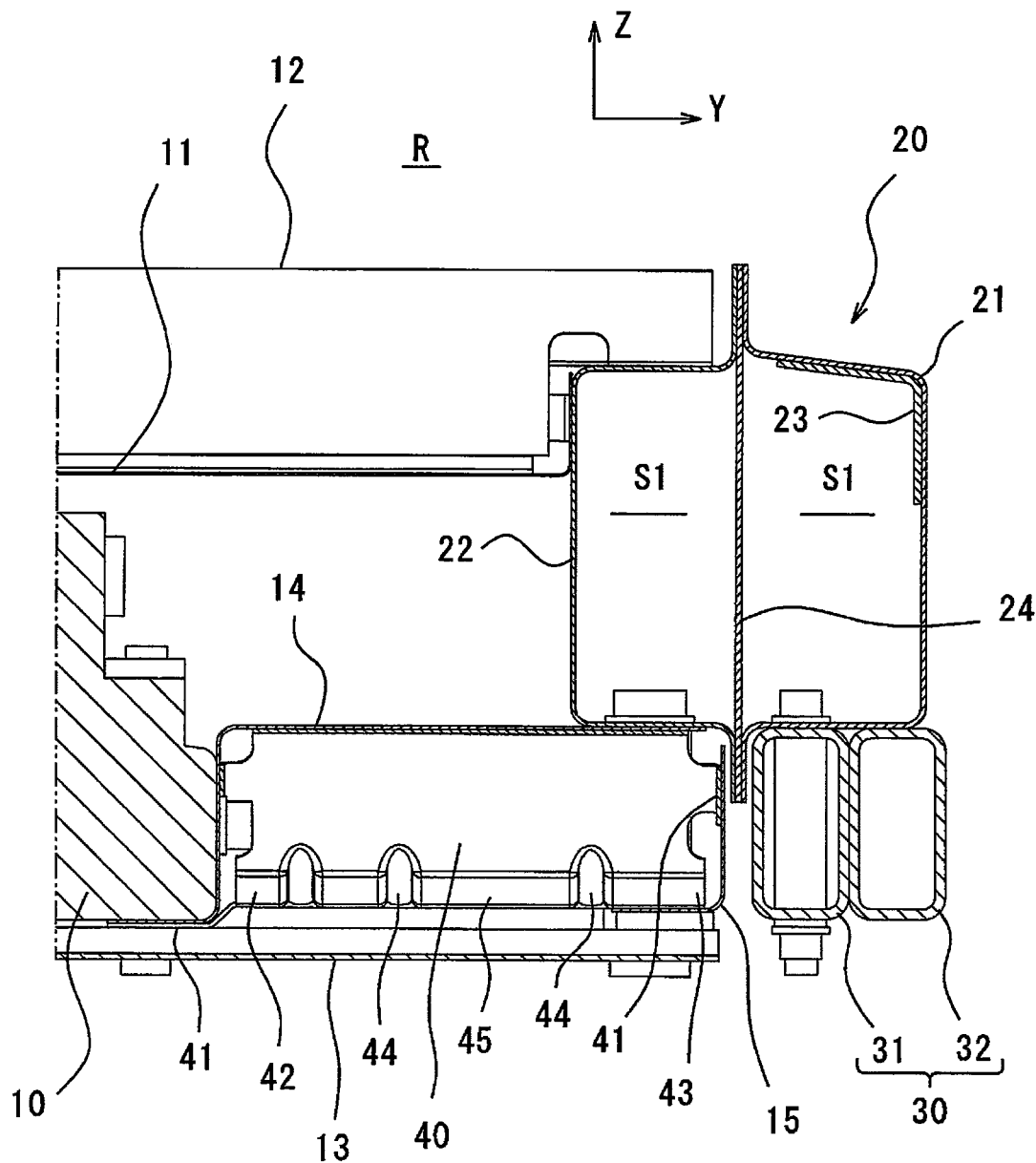
FIG. 2 is a cross-sectional view of a vehicle body structure for an electric vehicle according to a first embodiment of the present invention.

Referring to FIG. 2, a floor panel 11 is disposed above the battery 10. The floor panel 11 is a plate material constituting a lower surface of the vehicle interior R. In addition, a cross member 12 extending in the vehicle width direction is disposed above the battery 10. Although not shown in detail, a plurality of cross members 12 are provided at intervals in the vehicle body front-rear direction. The upper portions of the pair of side sills 20 are connected to each other by the plurality of cross members 12. It should be noted that in FIG. 2, only one of the pair of side sills 20 is shown.

The side sill 20 of the present embodiment is configured by bonding an outer member 21 to be disposed outside in the vehicle width direction and an inner member 22 to be disposed inside in the vehicle width direction. Both the outer member 21 and the inner member 22 are formed by bending a sheet metal into a hat shape, and are bonded and welded so as to form a hollow space S1. A reinforcing plate 23 is attached to an upper portion of the inner surface of the outer member 21 in order to improve strength.

The space S1 extends in the vehicle body front-rear direction. The space S1 is partitioned at the center in the vehicle width direction by a partition plate 24. The partition plate 24 is sandwiched and fixed between the outer member 21 and the inner member 22. The outer member 21, the inner member 22, the partition plate 24, and the reinforcing plate 23 are made of, for example, steel sheet metal. These may be made of, for example, an aluminum alloy sheet metal.

A bridge beam member (first member) 30 and a bridge pier member (second member) 40 are disposed below the side sill 20. Below the bridge pier member 40 and the battery 10, a bottom panel 13 supporting these is disposed. The bottom panel 13 is a member constituting a lower surface of the vehicle body structure 1.

Figure 3:
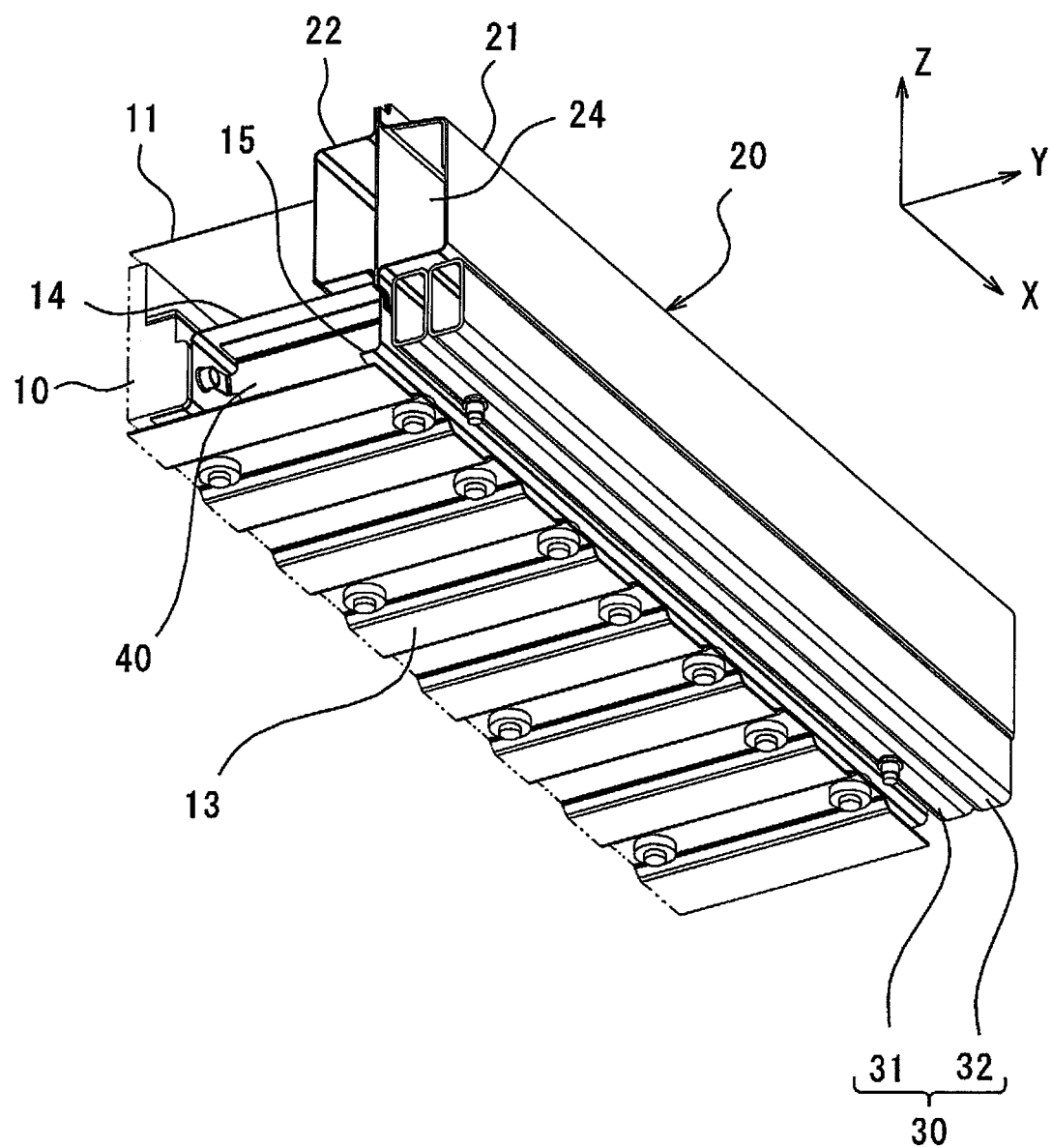
FIG. 3 is a perspective view of the vehicle body structure for an electric vehicle in FIG. 2.

Referring also to FIG. 3, the bridge beam member 30 includes two hollow tubular members 31 and 32 extending in the vehicle body front-rear direction along the side sill 20. The two tubular members 31 and 32 have the same shape, and a cross-sectional shape perpendicular to the vehicle body front-rear direction is a closed cross section (rectangular in the present embodiment). The two tubular members 31 and 32 are disposed below the outer member 21 and joined to the outer member 21, in a state of being joined side by side in the vehicle width direction. Specifically, of the two tubular members 31 and 32 joined to each other, the tubular member 31 disposed inside in the vehicle width direction is bolted to the outer member 21. The bridge beam member 30 is, for example, an extruded material made of an aluminum alloy. Alternatively, the bridge beam member 30 may be made of steel. In this case, plates (steel plates) are press-formed to be combined to form a closed cross section, which can be used as the bridge beam member 30. That is, the tubular members 31 and 32 can be integrally formed by extrusion forming.

The bottom panel 13 is formed in a wave shape when viewed from the vehicle width direction. The bottom panel 13 is joined to the inner member 22 of the side sill 20 via the L-shaped sheet metal 15 at the end portion in the vehicle width direction. The L-shaped sheet metal 15 is a member having an L-shape in the cross section perpendicular to the vehicle body front-rear direction and extending in the vehicle body front-rear direction along the side sill 20.

Figure 4:
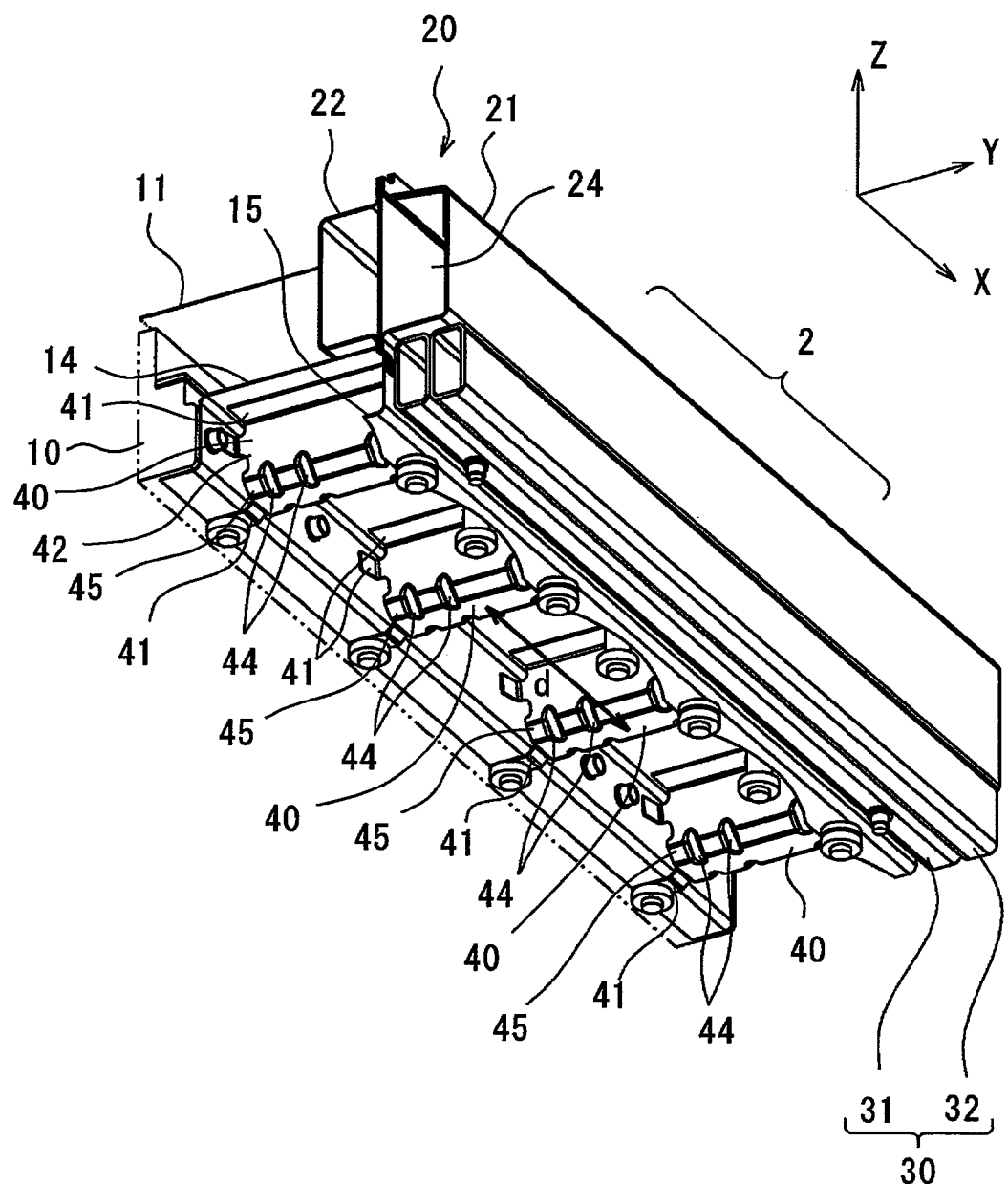
FIG. 4 is a perspective view in which a bottom panel is omitted from the vehicle body structure for an electric vehicle in FIG. 3.

FIG. 4 shows a state in which the bottom panel 13 is removed from the state shown in FIG. 3.

The bridge pier member 40 extends in the vehicle width direction from the battery 10 toward the bridge beam member 30. A plurality of bridge pier members 40 are arranged at intervals in the vehicle body front-rear direction, and are arranged at equal intervals (distance d), for example. Preferably, the bridge pier member 40 is made of steel. The bridge pier member 40 is formed by bending a sheet metal made of steel into a hat shape. The bridge pier member 40 is provided with a plurality of flange portions 41 for joining, and is fixed to the S-shaped sheet metal 14 and the L-shaped sheet metal 15 by the flange portions 41. The S-shaped sheet metal 14 is a member having an S-shape in the cross section perpendicular to the vehicle body front-rear direction and extending in the vehicle body front-rear direction along the side sill 20. The S-shaped sheet metal 14 is joined to the inner member 22 of the side sill 20 and the battery 10.

Specifically, in the vehicle width direction, one end 42 of the bridge pier member 40 is fixed to the battery 10 via the S-shaped sheet metal 14, and the other end 43 is fixed to the inner member 22 of the side sill 20 via the L-shaped sheet metal 15 (see FIG. 2). The bridge beam member 30 is disposed adjacent to the outer side in the vehicle width direction of the other end 43 of the bridge pier member 40. In addition, in the vehicle height direction, the bridge pier member 40 has an upper surface fixed to the S-shaped sheet metal 14 (see FIG. 4). In the vehicle height direction, the bridge pier member 40 is disposed at substantially the same height position as the bridge beam member 30. Therefore, at the time of side collision of the vehicle body, the side collision load suffered by the bridge beam member 30 is dispersed into the plurality of bridge pier members 40.

At the time of side collision of the vehicle body, the bridge pier member 40 efficiently absorbs collision energy by crushing in a bellows shape in the vehicle width direction. The bridge pier member 40 is provided with a plurality of beads 44 for promoting such crushing. The plurality of beads 44 are formed to extend in a direction perpendicular to the vehicle width direction at corner portions 45 of a hat shape of the bridge pier member 40.

Figure 5:
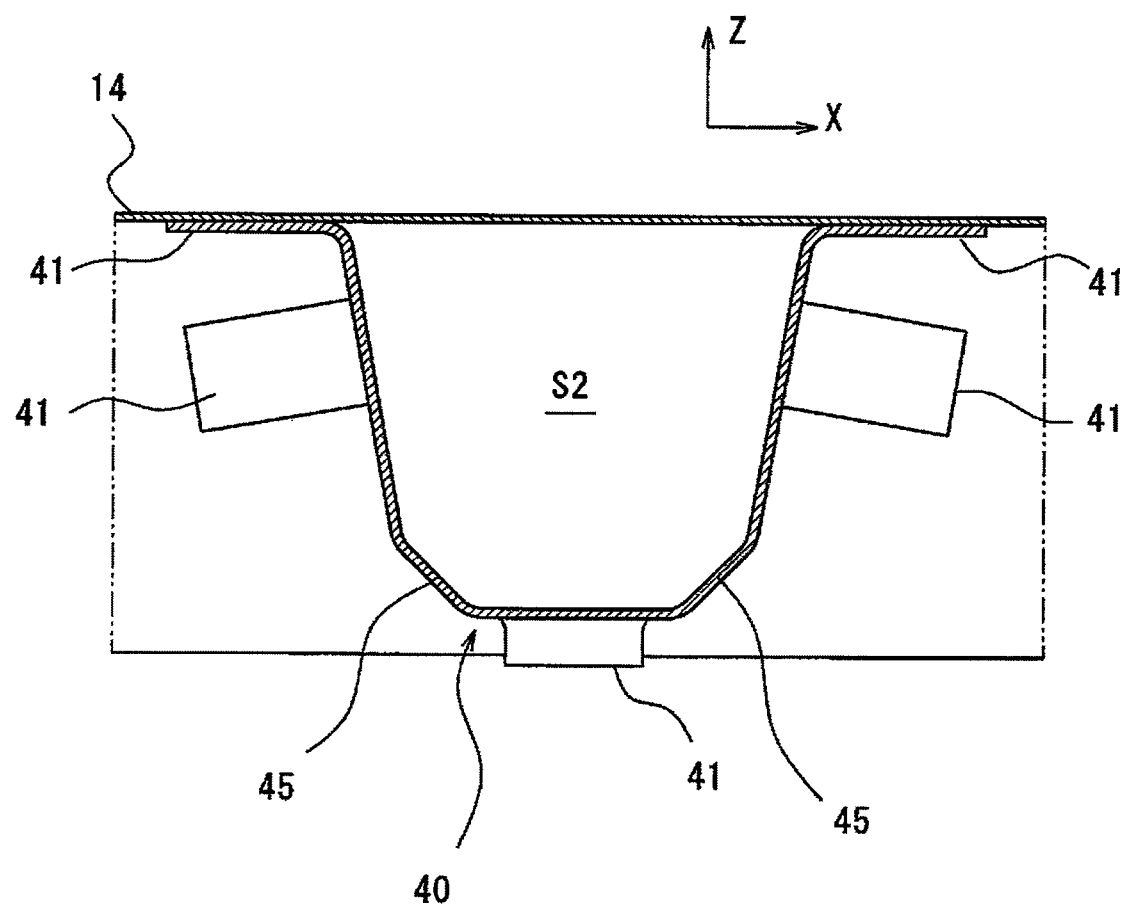
FIG. 5 is a cross-sectional view perpendicular to a vehicle width direction of a bridge pier member.

FIG. 5 shows a cross section perpendicular to the vehicle width direction of the bridge pier member 40. In FIG. 5, only one bridge pier member 40 and S-shaped sheet metal 14 are shown for clarity of illustration.

The bridge pier member 40 constitutes at least a part of a closed cross-sectional shape in a cross section perpendicular to the vehicle width direction. In the present embodiment, a closed cross-sectional shape defining the internal space S2 with the bridge pier member 40 and the S-shaped sheet metal 14 is formed. Although one internal space S2 is shown in FIG. 5, specifically, a plurality of closed cross-sectional shapes defining the internal space S2 are arranged in the vehicle body front-rear direction.

According to the vehicle body structure 1 of the present embodiment, when an object such as a pole collides with a side portion of the vehicle body, first, crushing of the hollow bridge beam member 30 together with the side sill 20 allows an impact to be absorbed, and the side sill 20 and the bridge beam member 30 allow an impact to be dispersed in the vehicle body front-rear direction. Next, since the bridge pier member 40 and the S-shaped sheet metal 14 extending in a tubular shape (shape defining the internal space S2) in the vehicle width direction support the bridge beam member 30 from the inside in the vehicle width direction, the bridge pier member 40 can firmly receive an impact from the vehicle side surface, and the impact can be further absorbed by the axial crushing (crushing in the vehicle width direction) of the bridge pier member 40. Therefore, in the vehicle body structure 1 for an electric vehicle, lightweight and high battery protection performance can be achieved.

In addition, since the bridge beam member 30 is made of an extruded material, the bridge beam member 30 can be easily manufactured at low cost.

In addition, since the cross section perpendicular to the vehicle body front-rear direction of the bridge beam member 30 is rectangular, the bridge beam member 30 can be easily manufactured at low cost. In addition, the force received from an object such as a pole on the outer surface of the bridge beam member 30 in the vehicle width direction can be released to the vehicle body frame or the like on the inner surface. That is, two surfaces facing each other in the vehicle width direction can be caused to act as a surface receiving a force and a surface releasing the force. In addition, an upper surface of the bridge beam member 30 can be easily joined to the side sill 20.

In addition, since the plurality of bridge pier members 40 are arranged side by side in the vehicle body front-rear direction, the bridge beam members 30 can be supported at a plurality of places in the vehicle body front-rear direction at the time of side collision. That is, it is possible to form a strong bridge structure in which the bridge beam member 30 is used as a bridge beam and the bridge pier member 40 is used as a bridge pier. With this structure, when an object such as a pole collides with the vehicle body side portion, an impact can be dispersed into a plurality of pieces from the bridge beam (first member) to the bridge pier (second member). Furthermore, since the bridge pier members 40 are discretely arranged at intervals in the vehicle body front-rear direction, the weight can be reduced as compared with the case where the bridge pier members 40 are continuously arranged. In addition, since a plurality of bridge pier members 40 are arranged, only the bridge pier member 40 arranged at a place where high strength is required can be designed with high strength as described in the following first and second modifications. In other words, since a low-strength material or the bridge pier member 40 having a small thickness can be adopted in a portion where high strength is not required, cost reduction and weight reduction can be achieved.

(First Modification)

In the above embodiment, the bridge pier members 40 are arranged at equal intervals d (see FIG. 4) in the vehicle body front-rear direction, but the bridge pier members 40 do not need to be arranged at equal intervals. For example, the arrangement interval of the bridge pier members 40 in a vehicle body front-rear direction central portion 2 may be relatively narrow. Specifically, the interval d shown in FIG. 4 may be set to be shorter in the vehicle body front-rear direction central portion 2 than in a vehicle body front-rear direction outer portion. The vehicle body front-rear direction central portion 2 is a portion including the center of gravity of the vehicle body, and refers to, for example, a region of about a center half of the arrangement region of the bridge pier members 40.

According to the present modification, since the bridge pier members 40 are densely arranged (interval d in FIG. 4 is designed to be narrow) at a place (vehicle body front-rear direction central portion 2) where high strength is required, the strength at the place can be improved. The reason why high strength is required in the vehicle body front-rear direction central portion 2 is that the center of gravity is positioned in the vehicle body front-rear direction central portion 2. For example, when an object such as a pole collides toward a position other than the center of gravity, the impact is released by rotation of the vehicle body. However, when an object such as a pole collides toward the center of gravity, the impact is applied to the vehicle body without being released because the vehicle body does not rotate. Therefore, the vehicle body front-rear direction central portion 2 to which a relatively large impact may be applied is required to have a relatively high strength.

(Second Modification)

In the above embodiment, all the bridge pier members 40 are configured with the same strength, but all the bridge pier members 40 do not have to be configured with the same strength. For example, the strength of the bridge pier member 40 in the vehicle body front-rear direction central portion 2 may be relatively increased. Specifically, the quality of material of the bridge pier member 40 in the vehicle body front-rear direction central portion 2 may be made higher in strength than the quality of material of the bridge pier member 40 outside in the vehicle body front-rear direction. Alternatively, the thickness of the bridge pier member 40 in the vehicle body front-rear direction central portion 2 may be made larger than the thickness of the bridge pier member 40 outside in the vehicle body front-rear direction. Alternatively, the shape of the bridge pier member 40 in the vehicle body front-rear direction central portion 2 may be made higher in strength than the shape of the bridge pier member 40 outside in the vehicle body front-rear direction.

According to the present modification, as described above, the strength can be relatively improved in the vehicle body front-rear direction central portion 2 where high strength is required. Here, in order to design the bridge pier member 40 to have a relatively high strength, a material having high strength may be adopted, the thickness may be increased, or a strong shape may be adopted.

Second Embodiment

Figure 6:
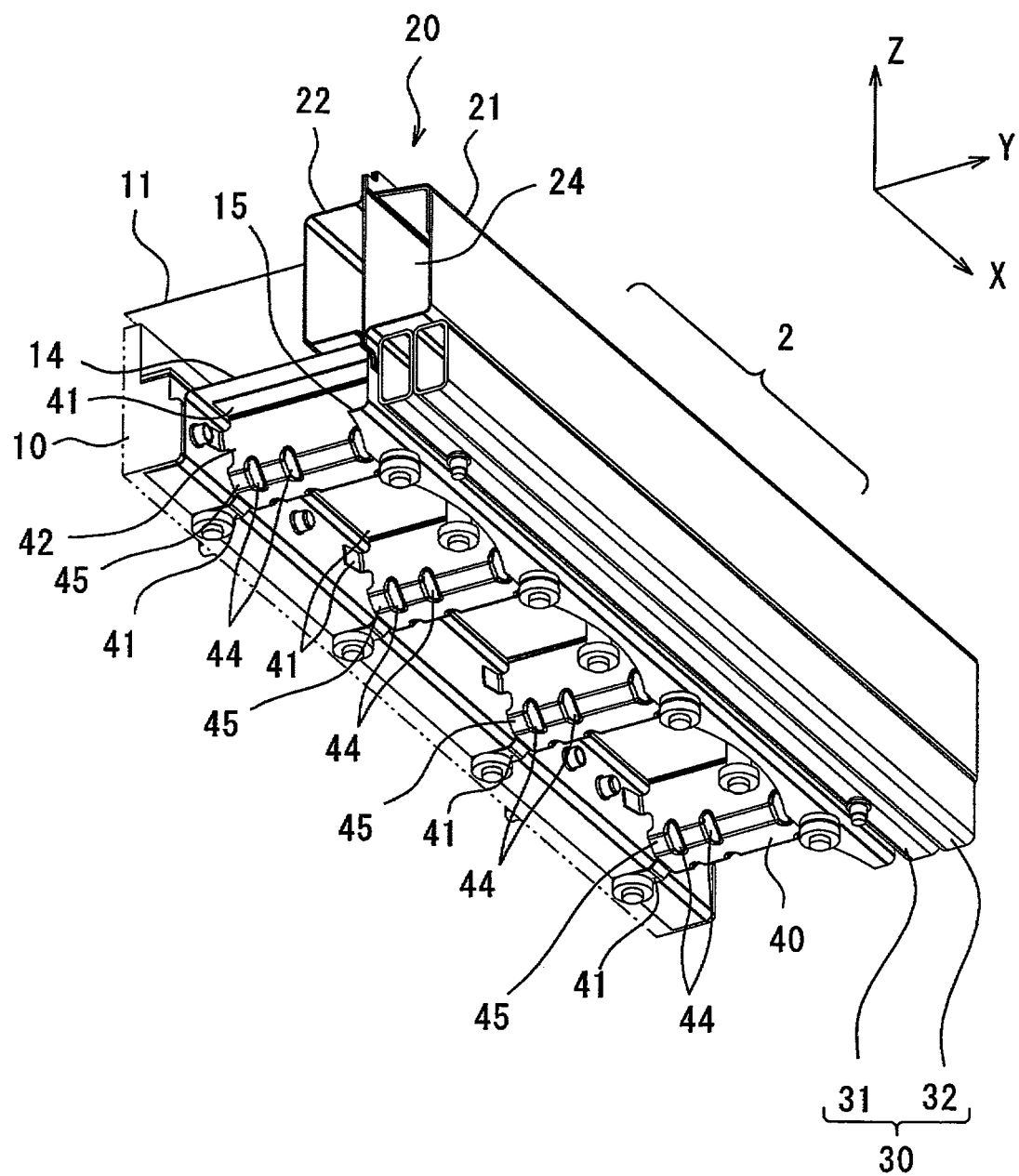
FIG. 6 is a perspective view of a vehicle body structure for an electric vehicle according to a second embodiment.

In the vehicle body structure 1 for an electric vehicle of a second embodiment shown in FIG. 6, the bridge pier member 40 is not separated but connected in the vehicle body front-rear direction. Except for the configuration related thereto, the configuration is substantially the same as the configuration of the vehicle body structure 1 for an electric vehicle of the first embodiment. Therefore, the same components as those shown in the first embodiment are denoted by the same reference numerals and the description thereof will be omitted.

In the present embodiment, unlike the first embodiment, one bridge pier member 40 is provided. The bridge pier member 40 is formed by forming by bending a single plate material into a plurality of continuous hat shapes.

As in the present embodiment, the bridge pier member 40 is not necessarily separated and arranged into a plurality in the vehicle body front-rear direction, and may have a continuous configuration.

As described above, although the specific embodiments and their modifications of the present invention are described, the present invention is not limited to the above-described embodiments, and can be implemented with various modifications within the scope of the present invention. For example, an appropriate combination of contents of the individual embodiments may be one embodiment of the present invention.

Figure 7:
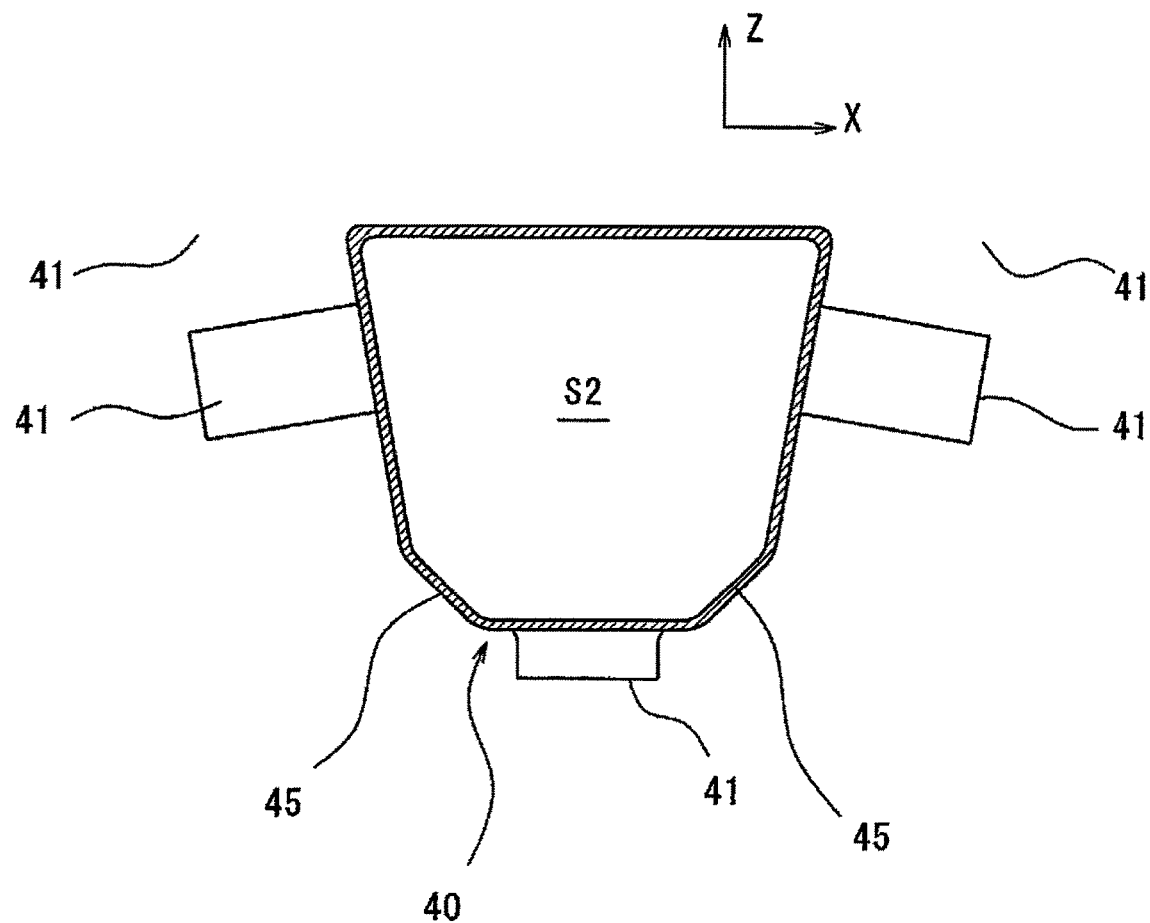
FIG. 7 is a cross-sectional view showing a modification of the bridge pier member.

In addition, as the shape of the bridge pier member 40, a hat-shaped cross section perpendicular to the vehicle width direction is exemplified, but the shape of the bridge pier member 40 is not limited thereto. For example, as shown in FIG. 7, the shape of the bridge pier member 40 may be a substantially isosceles trapezoid in a cross section perpendicular to the vehicle width direction, and the bridge pier member 40 may independently form a closed cross section defining the space S2. In addition, the shape of the bridge pier member 40 may be a shape independently constituting a closed cross section, such as a polygonal shape other than this or a circular shape, or may be a shape which constitutes a part of another closed cross section.

In addition, as the shape of the bridge beam member 30, a shape having a rectangular cross section perpendicular to the vehicle body front-rear direction (set of two rectangles) is exemplified, but the shape of the bridge beam member 30 is not limited thereto. For example, the shape of the bridge beam member 30 may be a shape in which a cross section perpendicular to the vehicle body front-rear direction constitutes a closed cross section such as a polygon other than a rectangle, or a circle.

What is claimed is:

1. A vehicle body structure for an electric vehicle comprising:
   a battery disposed at a center lower portion of a vehicle body;
   a side sill being hollow, the side sill extending in a vehicle body front-rear direction outside in a vehicle width direction of the battery;
   a first member being hollow, the first member disposed below the side sill and outside in the vehicle width direction of the battery, the first member extending in the vehicle body front-rear direction, the first member having a cross section perpendicular to the vehicle body front-rear direction formed as a closed cross section; and
   at least one second member made of steel, the second member arranged substantially between the battery and the first member in the vehicle width direction, the second member extending in the vehicle width direction from the battery toward the first member, the second member having a cross section perpendicular to the vehicle width direction forming at least a part of a closed cross-sectional shape, wherein a plurality of second members are arranged at intervals in the vehicle body front-rear direction, and wherein the second member arranged in a center of the vehicle in the vehicle body front-rear direction has higher strength than the second member located at an end of the vehicle in the vehicle body front-rear direction.

2. The vehicle body structure for an electric vehicle according to claim 1, wherein the second member forms a closed cross-sectional shape together with another member.

3. The vehicle body structure for an electric vehicle according to claim 1, wherein the second member independently forms a closed cross-sectional shape.

4. The vehicle body structure for an electric vehicle according to claim 1, wherein the first member is made of an extruded material.

5. The vehicle body structure for an electric vehicle according to claim 1, wherein the first member is made of steel.

6. The vehicle body structure according to claim 1, wherein the closed cross section of the first member is rectangular.

7. The vehicle body structure according to claim 6, wherein an arrangement interval of the second members in a vehicle body front-rear direction central portion is relatively narrow.

8. The vehicle body structure for an electric vehicle according to claim 2, wherein the first member is made of an extruded material.

9. The vehicle body structure for an electric vehicle according to claim 3, wherein the first member is made of an extruded material.

10. The vehicle body structure for an electric vehicle according to claim 2, wherein the first member is made of steel.

11. The vehicle body structure for an electric vehicle according to claim 3, wherein the first member is made of steel.

12. The vehicle body structure according to claim 2, wherein the closed cross section of the first member is rectangular.

13. The vehicle body structure according to claim 3, wherein the closed cross section of the first member is rectangular.

14. The vehicle body structure according to claim 4, wherein the closed cross section of the first member is rectangular.

15. The vehicle body structure according to claim 5, wherein the closed cross section of the first member is rectangular.

* * * * *